(12) United States Patent
Tamamoto et al.

(10) Patent No.: US 6,679,232 B2
(45) Date of Patent: Jan. 20, 2004

(54) MIXER FOR MULTICYLINDER GAS ENGINE

(75) Inventors: Ryuhei Tamamoto, Wako (JP); Shinji Yamanaka, Wako (JP); Masanori Fujinuma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/187,966

(22) Filed: Jul. 3, 2002

(65) Prior Publication Data
US 2003/0015180 A1 Jan. 23, 2003

(30) Foreign Application Priority Data
Jul. 11, 2001 (JP) ........................................ 2001-211062

(51) Int. Cl.[7] ................................................. F01B 29/10
(52) U.S. Cl. ...................................................... 123/527
(58) Field of Search ......................................... 123/527

(56) References Cited

U.S. PATENT DOCUMENTS 3,068,085 A * 12/1962 Ensign et al. .................. 48/184

FOREIGN PATENT DOCUMENTS

JP 04171258 A * 6/1992 .......... F02M/21/02

* cited by examiner

Primary Examiner—Noah P. Kamen
(74) Attorney, Agent, or Firm—Arent Fox Kintner Plotkin & Kahn, PLLC

(57) ABSTRACT

A mixer for a multicylinder gas engine is provided in which a plurality of intake passages extend to a plurality of cylinders. A plurality of gaseous fuel nozzles, each having a nozzle orifice opening in a venturi part of the corresponding intake passage, are provided in a mixer main body. The plurality of gaseous fuel nozzles are connected to a gaseous fuel supply device, wherein a common surge tank housing the plurality of gaseous fuel nozzles and having a fuel intake pipe opening therein is provided on the mixer main body. The fuel intake pipe extends to the gaseous fuel supply device. Intake pressure pulsations that have passed through the gaseous fuel nozzles are attenuated within the surge tank, thereby achieving uniform distribution of a gaseous mixture to each cylinder, minimizes the number of parts, and prevents fluctuations in the fuel concentration of the gaseous mixture.

20 Claims, 7 Drawing Sheets

US 6,679,232 B2

MIXER FOR MULTICYLINDER GAS ENGINE

BACKGROUND OF THE INVENTION

1. Field of the Invention

The present invention relates to a mixer for a multicylinder gas engine having a plurality of intake passages extending to a plurality of cylinders of the engine and a plurality of gaseous fuel nozzles, wherein each nozzle has a nozzle orifice opening in a corresponding intake passage. The intake passages and fuel nozzles are provided in a mixer main body and the fuel nozzles are connected to a gaseous fuel supply device.

2. Related Art

In a conventional mixer for a multicylinder gas engine, a gaseous mixture of a gaseous fuel and air formed in a common intake passage is distributed to a plurality of cylinders of the engine via an intake manifold.

Since the above-described arrangement employs a single common intake passage for a plurality of cylinders, the structural arrangement is simple and can be provided at a low cost. However, the influence of interference between the cylinder intakes makes uniform distribution of the gaseous mixture among the cylinders difficult. In order to avoid the influence of interference between the cylinder intakes, theoretically, each cylinder could be provided with a separate mixer, but in practice, such an arrangement would greatly increase the number of parts, thereby resulting in an undesirable increase in cost.

SUMMARY OF THE INVENTION

It is an object of the present invention to overcome the above-described drawbacks of the conventional gas engine mixer.

It is also an object of the present invention to provide a mixer for a multicylinder gas engine that achieves uniform distribution of a gaseous mixture to each cylinder while minimizing any increase in the number of parts, and prevents fluctuations in the fuel concentration of the gaseous mixture due to pulsations in the intake pressure.

According to a preferred embodiment of the present invention, a mixer is provided for a multicylinder gas engine in which a plurality of intake passages extend to a plurality of cylinders of the engine. A plurality of gaseous fuel nozzles, each having a nozzle orifice opening in a corresponding intake passage, are provided in a mixer main body. The plurality of gaseous fuel nozzles are connected to a gaseous fuel supply device. A common surge tank housing the plurality of gaseous fuel nozzles and having a fuel intake pipe opening therein is provided on the mixer main body. The fuel intake pipe extends to the gaseous fuel supply device and intake pressure pulsations that have passed through the gaseous fuel nozzles are attenuated within the surge tank.

Because the plurality of intake passages are separated from each other so as to correspond to the plurality of cylinders of the engine, even if there is a difference in the intake timing of the plurality of cylinders that causes a difference in the timing of an intake negative pressure acting on each of the intake passages, the intake passages are not affected by interference between the cylinder intakes, and equalization of the intake volumes of the cylinders is achieved. Furthermore, since the surge tank is between the plurality of gaseous fuel nozzles, even when an intake pressure pulsation reaches one of the intake passages, the intake pressure pulsation enters the surge tank via the corresponding gaseous fuel nozzle and is attenuated, thereby preventing the intake pressure pulsation from having any influence on another gaseous fuel nozzle. As a result, each of the gaseous fuel nozzles issues a precise amount of gaseous fuel into the corresponding intake passage according to the degree of negative pressure generated in the intake passage. Accordingly, fluctuations in the fuel concentration of the gaseous mixture supplied to each of the cylinders is prevented, thereby stabilizing operation of the engine. Moreover, use of the common surge tank as an intake pressure attenuator reduces the number of parts and keeps any costs to a minimum.

According to a second embodiment of the present invention, the volume of the surge tank is set at 20% or more of the displacement of the engine. Thus, the surge tank reliably attenuates the intake pressure pulsations to ensure stable operation of the engine.

According to a third embodiment of the present invention, the nozzle orifice of each gaseous fuel nozzle is positioned at substantially the center of the corresponding intake passage. Thus, a negative pressure generated by a flow of air passing through each of the intake passages acts effectively on the nozzle orifice of the corresponding gaseous fuel nozzle. The structure of the third embodiment allows a precise amount of gaseous fuel to be issued into the intake passage according to the level of the negative pressure, thus achieving further stabilization of the fuel concentration of the gaseous mixture.

According to a fourth embodiment of the present invention, disposed between each of the plurality of gaseous fuel nozzles and the common fuel intake pipe is a unidirectional valve that allows fuel to flow in only one direction from the latter to the former. Thus, cooperation between the unidirectional valve and the surge tank further enhances the effect of attenuating the intake pressure pulsations.

BRIEF DESCRIPTION OF THE DRAWINGS

The structure and method for carrying out the present invention are explained below by reference to the preferred embodiments of the present invention in the attached drawings, wherein.

DETAILED DESCRIPTION OF PREFERRED EMBODIMENTS

Figure 1:
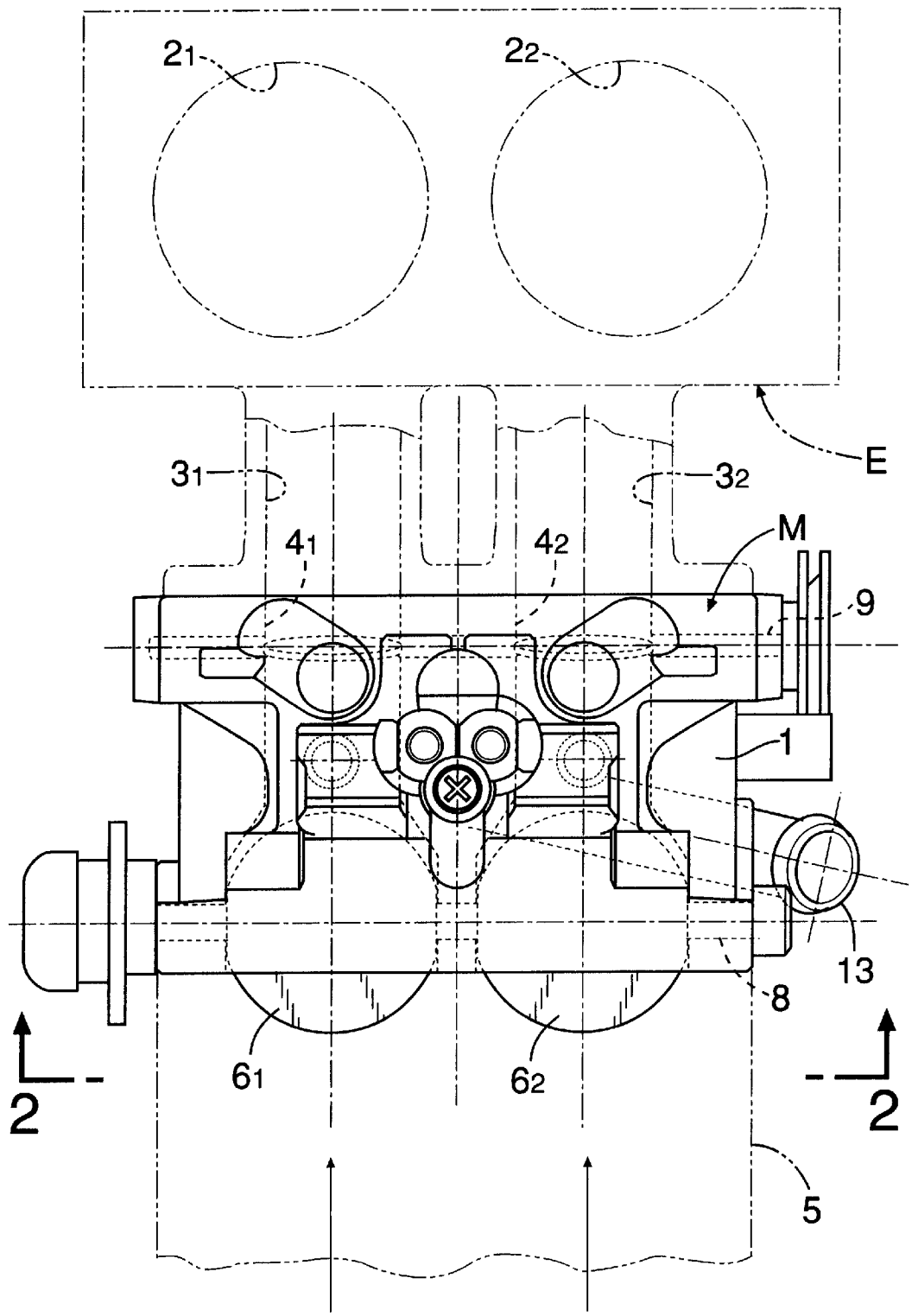
FIG. 1 is a plan view of a mixer for a two cylinder gas engine according to a preferred embodiment according to the present invention.
Figure 2:
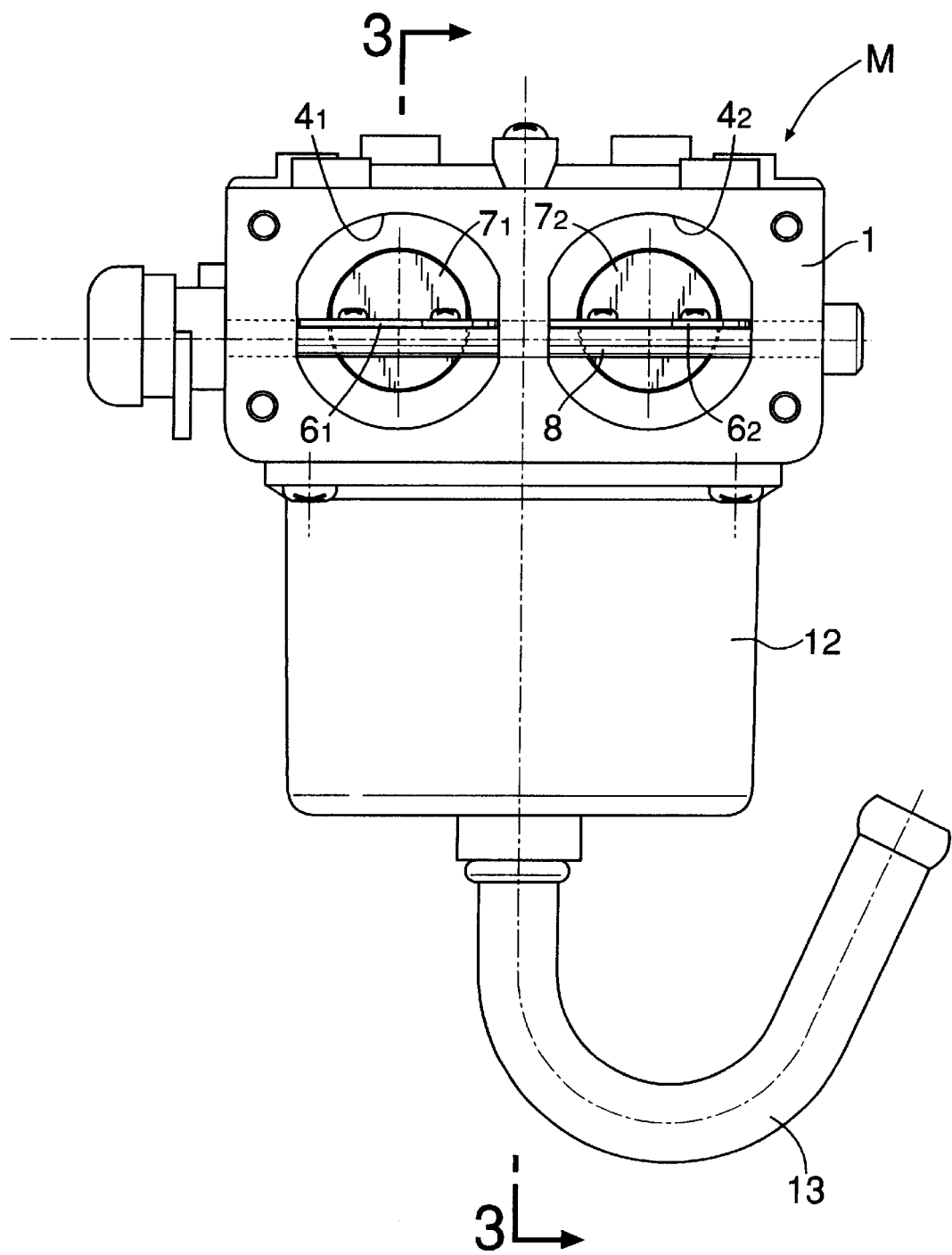
FIG. 2 is a cross-sectional side view taken along line 2—2 in FIG. 1.
Figure 3:
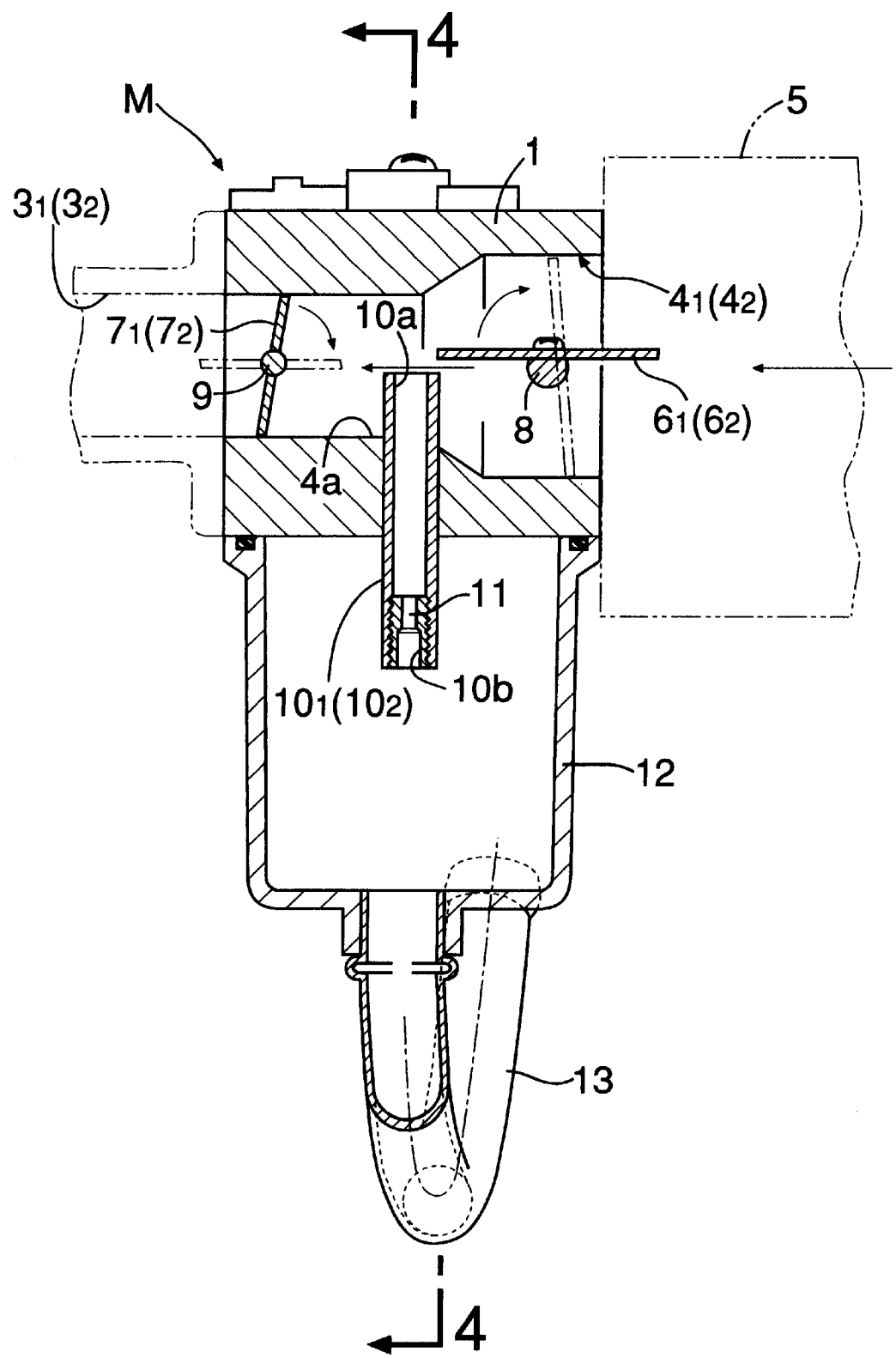
FIG. 3 is a cross-sectional side view taken along line 3—3 in FIG. 2.

A preferred embodiment of the present invention is explained below by reference to FIGS. 1 to 6. As shown in FIGS. 1 to 3, formed in a mixer body 1 of a gas engine mixer M are two intake passages $4_1$ and $4_2$ that are arranged horizontally and parallel relative to each other. The intake passages $4_1$ and $4_2$ are connected to two intake ports $3_1$ and $3_2$, respectively, of a gas engine E having two cylinders $2_1$ and $2_2$. A common air cleaner 5 is mounted to the upstream side of the intake passages $4_1$ and $4_2$.

Disposed in each of the intake passages $4_1$ and $4_2$ is a butterfly type choke valve $6_1$ or $6_2$ on the upstream side relative to a venturi part 4a that is in the middle of the corresponding intake passage $4_1$ or $4_2$, and a butterfly type throttle valve $7_1$ or $7_2$ on the downstream side relative to the venturi part 4a. A common choke valve shaft 8 that supports the choke valves $6_1$ and $6_2$ so that the choke valves can open and close and a common throttle valve shaft 9 that supports the throttle valves $7_1$ and $7_2$ so that they can open and close, are supported in the mixer body 1 so that the choke valve 8 and the throttle valve shaft 9 are parallel relative to each other.

Figure 4:
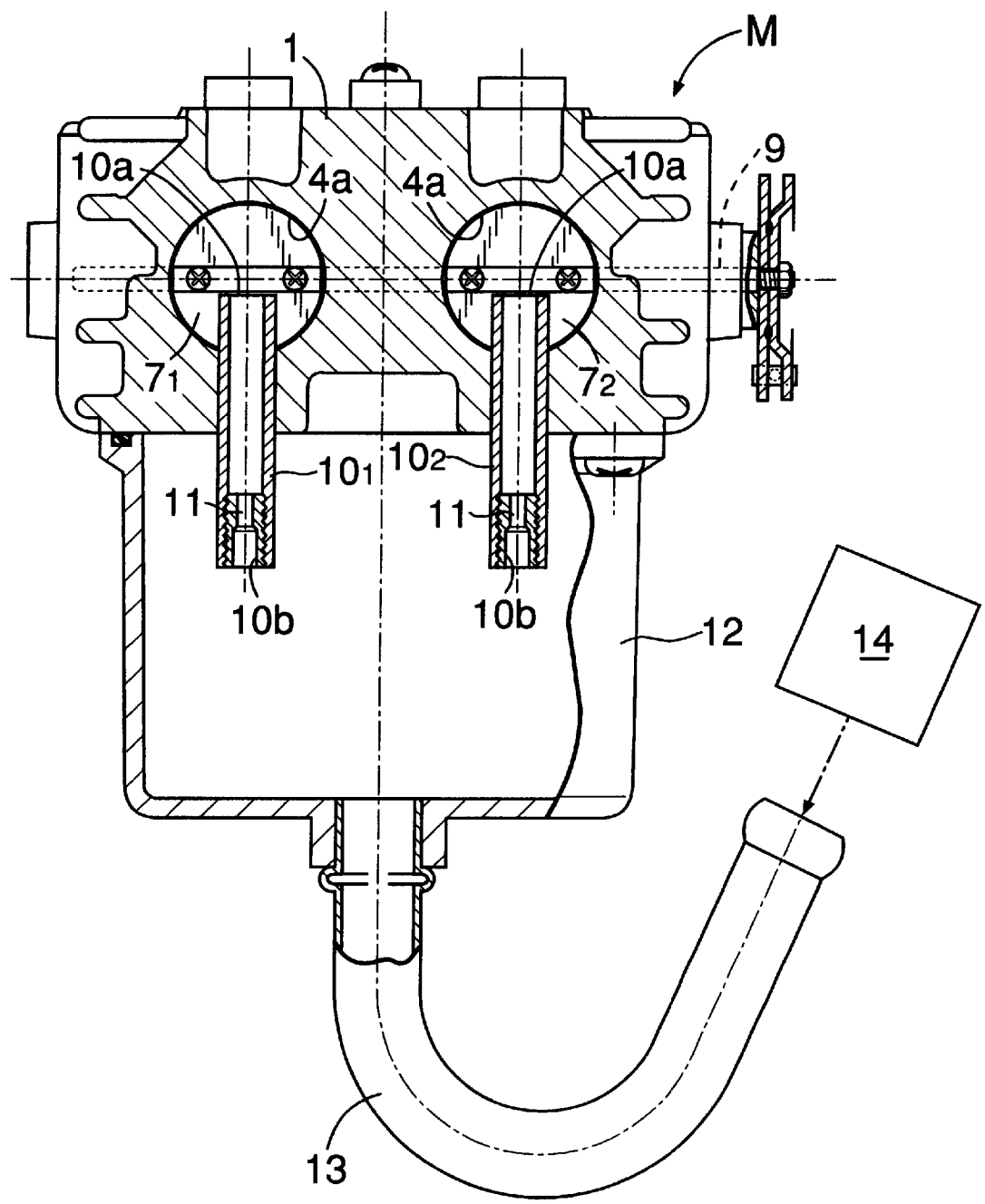
FIG. 4 is a cross-sectional side view taken along line 4—4 in FIG. 3.

As shown in FIGS. 3 and 4, the mixer body 1 is provided with gaseous fuel nozzles $10_1$ and $10_2$ and a nozzle orifice 10a at the upper end of each of the gaseous fuel nozzles $10_1$ and $10_2$ that opens into the venturi part 4a of the corresponding intake passage $4_1$ or $4_2$. In this embodiment, the gaseous fuel nozzles $10_1$ and $10_2$ are disposed so that each of the nozzle orifices 10a opens in approximately the center of the corresponding venturi part 4a. The lower ends of the gaseous fuel nozzles $10_1$ and $10_2$ project beneath the mixer body 1 and are provided in entrances 10b with fuel jets 11 that meter the amount of entering gaseous fuel.

Operatively attached to the lower end face of the mixer body 1 is a common surge tank 12 that houses the gaseous fuel nozzles $10_1$ and $10_2$. The surge tank 12 is configured to have a volume that is 20% or more of the displacement of the engine E.

Operatively attached to the base of the surge tank 12 is a fuel intake pipe 13, through which the pressure-regulated gaseous fuel that has been fed from a gaseous fuel supply device 14 is supplied to the surge tank 12.

Operation of the preferred embodiment is explained below.

During the intake stroke of each cylinder $2_1$ and $2_2$ and while the engine E is operating, the air that has been cleaned by the air cleaner 5 flows through the corresponding intake passage $4_1$ or $4_2$ toward the corresponding intake port $3_1$ or $3_2$ of the engine E. The negative pressure generated in the venturi part 4a effectively acts on the nozzle orifice 10a of the corresponding gaseous fuel nozzle $10_1$ or $10_2$ opening in approximately the center of the venturi part 4a. The gaseous fuel fed from the gaseous fuel supply device 14 to the surge tank 12 is reliably drawn into the corresponding venturi part 4a via the gaseous fuel nozzles $10_1$ and $10_2$ and, while being mixed with the above-mentioned air to form a gaseous mixture, taken into the cylinders $2_1$ and $2_2$ via the intake ports $3_1$ and $3_2$. Accordingly, the amount of gaseous mixture supplied to each of the cylinders $2_1$ and $2_2$ is controlled by the degree of opening of the corresponding throttle valve $7_1$ or $7_2$.

Since the two intake passages $4_1$ and $4_2$ are independent of each other and correspond to the two cylinders $2_1$ and $2_2$, even if a difference in the intake timing between the two cylinders $2_1$ and $2_2$ were to cause a difference in the timing of the intake negative pressures acting on the intake passages $4_1$ and $4_2$, no interference between the intakes of cylinders $2_1$ and $2_2$ occurs in the intake passages $4_1$ and $4_2$, thereby achieving equalization of the intake volumes of the cylinders $2_1$ and $2_2$.

In the afore-mentioned conventional mixer, any intake pressure pulsation that is generated accompanying the intake stroke of one of the cylinders $2_1$ and $2_2$, reaches the corresponding intake passage $4_1$ or $4_2$ and, via the corresponding gaseous fuel nozzle $10_1$ or $10_2$ acts on the gaseous fuel nozzle $10_2$ or $10_1$ on the other side. However, in the present invention, because the surge tank 12 is positioned between the gaseous fuel nozzles $10_1$ and $10_2$, the intake pressure pulsation entering the surge tank 12 via one of the gaseous fuel nozzles $10_1$ or $10_2$ is attenuated within the surge tank 12, thereby preventing the intake pressure pulsation from influencing the other gaseous fuel nozzle $10_2$ or $10_1$. As a result, the gaseous fuel nozzles $10_1$ and $10_2$ each issue a precise amount of gaseous fuel into the corresponding venturi part 4a according to the negative pressure generated in the venturi part 4a. Accordingly, fluctuations in the fuel concentration in the gaseous mixture supplied to the corresponding cylinder $2_1$ or $2_2$ is prevented, thereby stabilizing operation of the engine E.

Moreover, the use of the common surge tank 12 avoids any increase in the number of parts and thereby minimizes costs.

Figure 5:
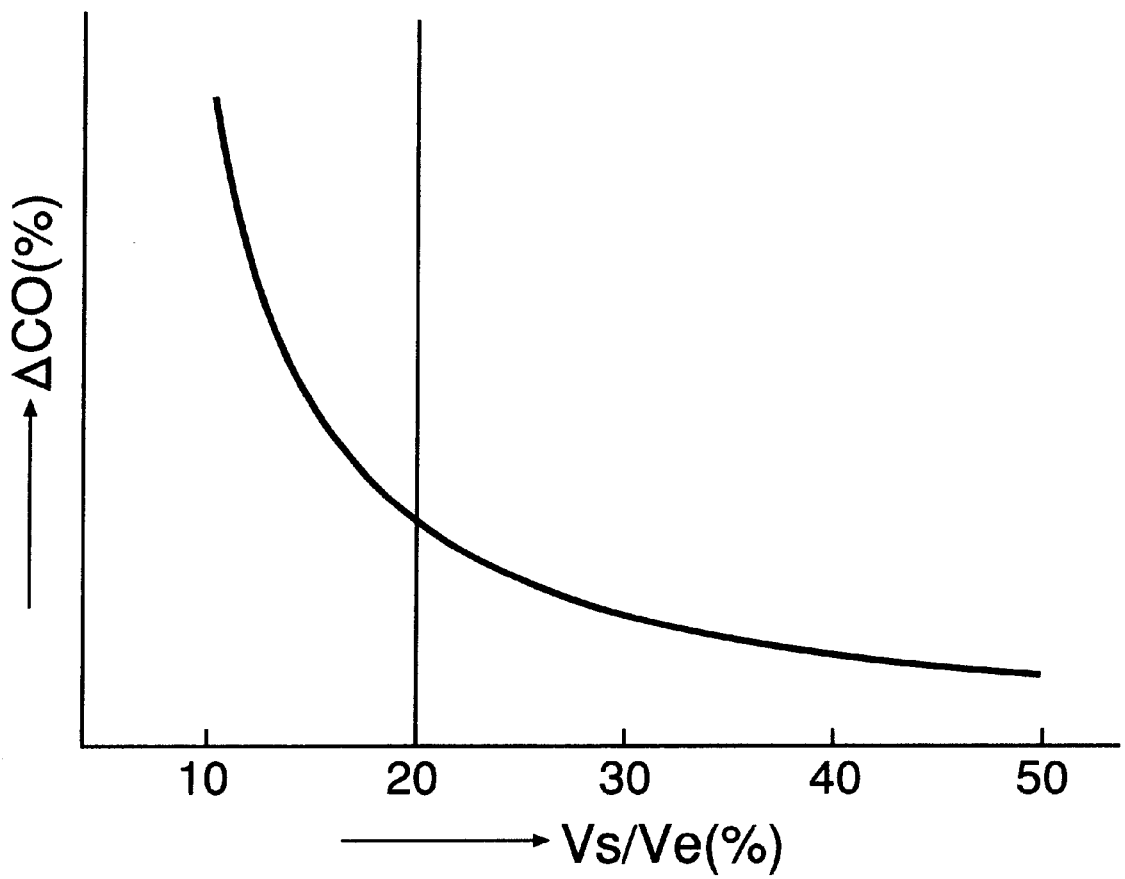
FIG. 5 is a graph showing the relationship between the ratio of the surge tank volume relative to the engine displacement and the difference in carbon monoxide (CO) concentration between the exhaust gases.

FIG. 5 is a graph illustrating test results of the relationship between the ratio (Vs/Ve) of the volume (Vs) of the surge tank 12 to the engine displacement (Ve) and the difference ($\Delta$CO) in carbon monoxide (CO) concentration between the exhaust gases from the cylinders $2_1$ and $2_2$. In the graph, a small ($\Delta$CO) means that the difference in intake volume and the difference in fuel concentration of the gaseous mixture between the cylinders $2_1$ and $2_2$ are small.

It was thus found that when the ratio (Vs/Ve) exceeds 20%, ($\Delta$CO) attains a value that ensures a stable operating state of the engine E. That is, arranging the volume (Vs) of the surge tank 12 to be 20% or more of the engine displacement (Ve) allows the surge tank 12 to exhibit an adequate effect in attenuating intake pressure pulsations so as to ensure stable operation of the engine.

Figure 6:
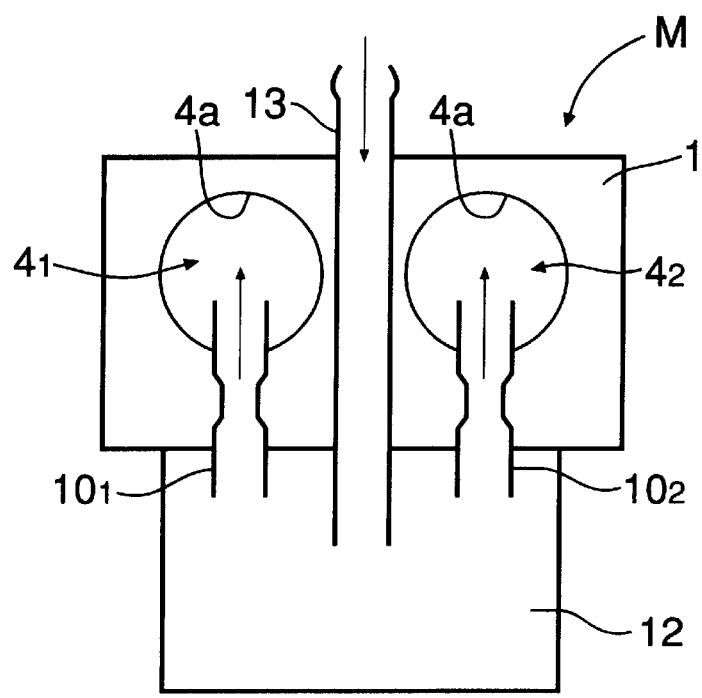
FIG. 6 is a cross-sectional side view, corresponding to that of FIG. 4, of a second embodiment according to the present invention.

Next, a second embodiment of the present invention is explained by reference to FIG. 6.

The second embodiment has the same arrangement as that of the preferred embodiment discussed above except that a fuel intake pipe 13 is disposed between two intake passages $4_1$ and $4_2$. Using the space between the two intake passages $4_1$ and $4_2$ for placement of the fuel intake pipe 13 reduces the dimensions of the mixer M.

Figure 7:
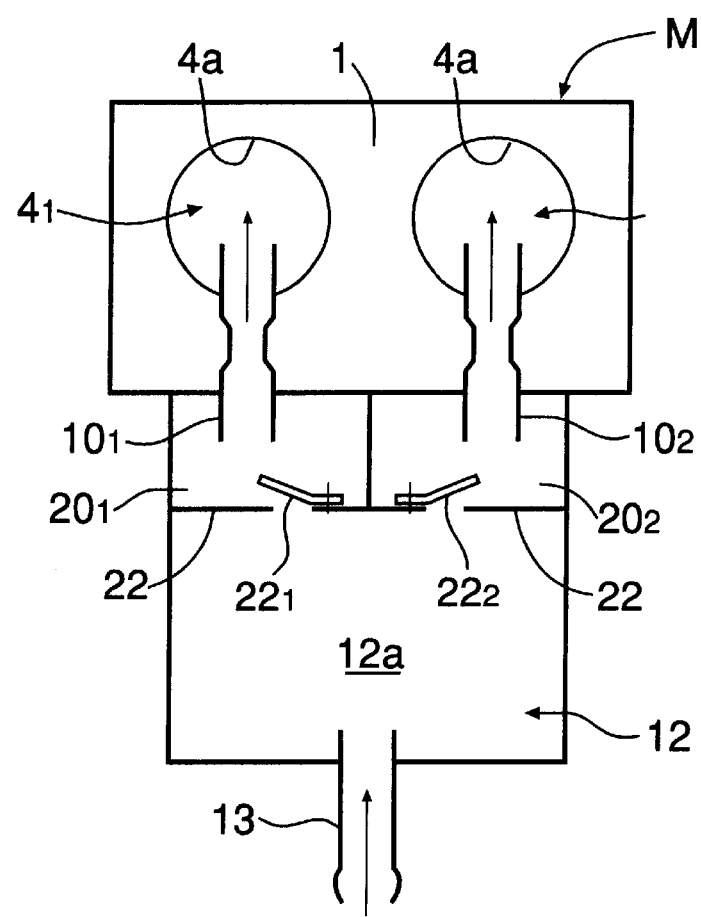
FIG. 7 is a cross-sectional side view, corresponding to that of FIG. 4, of a third embodiment according to the present invention.

Next, a third embodiment of the present invention is explained by reference to FIG. 7.

In the third embodiment, two chambers $20_1$ and $20_2$ that are small relative to the overall size of the surge tank are formed in the surge tank 12 into which entrances 10b of two gaseous fuel nozzles $10_1$ and $10_2$ open, respectively. The small chambers $20_1$ and $20_2$ are separated by partitions 22 from a main part 12a of the surge tank 12, and a fuel intake pipe 13 opening in the main part 12a. Provided in each of the partitions 22 is a one-way valve $22_1$ or $22_2$, such as, for example only, a reed valve, thereby allowing the fuel to flow in only one direction from the main part 12a of the surge tank 12 to the small chambers $20_1$ and $20_2$.

In accordance with the third embodiment, the non-return function of the one-way valves $22_1$ and $22_2$ results in cutting of the positive pressure of the intake pressure pulsations entering the small chambers $20_1$ and $20_2$ via the corresponding gaseous fuel nozzle $10_1$ or $10_2$, so that only the negative pressure is transmitted to the main part $12a$ of the surge tank 12. The intake pressure pulsations entering the main part $12a$ are cut in half, thereby further enhancing the overall attenuation effect of the intake pressure pulsations.

Figure 8:
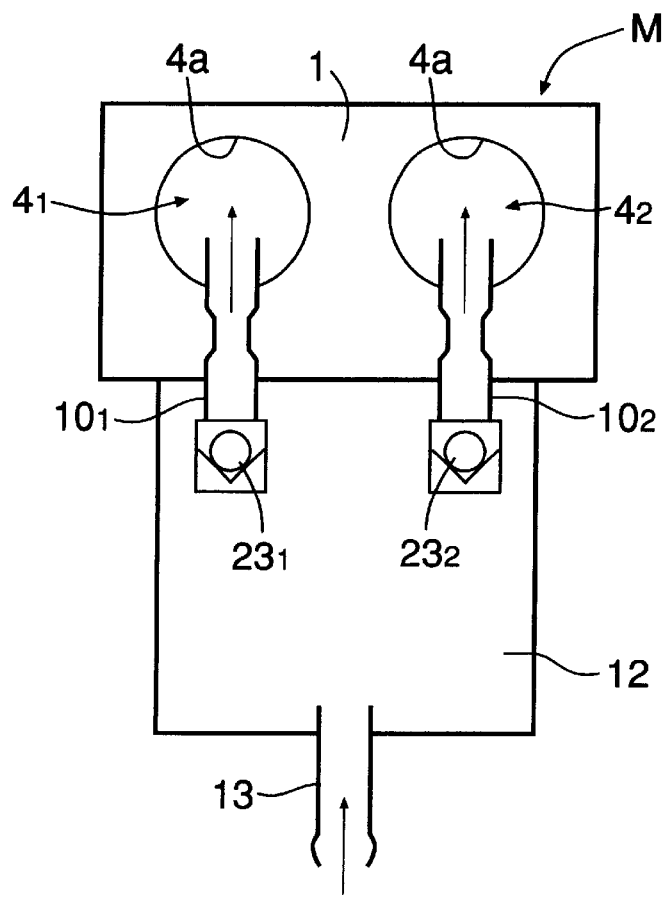
FIG. 8 is a cross-sectional side view, corresponding to that of FIG. 4, of a fourth embodiment according to the present invention.

Next, a fourth embodiment of the present invention is explained by reference to FIG. 8.

The fourth embodiment has the same arrangement as that of the third embodiment discussed above except that two one-way valves $23_1$ and $23_2$, respectively, are provided between the surge tank 12 and entrances $10b$ of the gaseous fuel nozzles $10_1$ and $10_2$ to prevent backflow of the gaseous fuel.

In accordance with the fourth embodiment, the overall effect of attenuating the intake pressure pulsations can be further heightened by the same action as that of the third embodiment.

Figure 9:
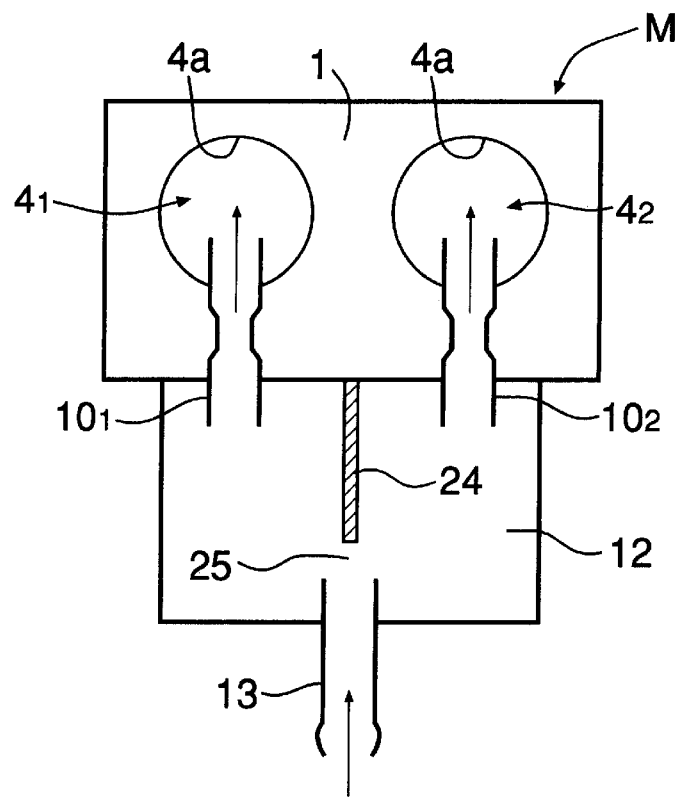
FIG. 9 is a cross-sectional side view, corresponding to that of FIG. 4, of a fifth embodiment according to the present invention.

Finally, a fifth embodiment of the present invention is explained by reference to FIG. 9.

In the fifth embodiment, a dividing wall 24 is provided between two gaseous fuel nozzles $10_1$ and $10_2$ so as to partition the surge tank 12. Provided in the partition 24, at a position furthest from the gaseous fuel nozzles $10_1$ and $10_2$, is an opening 25 that provides communication between the two gaseous fuel nozzles $10_1$ and $10_2$ and a fuel intake pipe 13 that is disposed so as to face the opening 25.

In accordance with the fifth embodiment, while an intake pressure pulsation entering the surge tank 12 from one of the gaseous fuel nozzles $10_1$ and $10_2$ is being attenuated within the surge tank 12, the influence of the intake pressure pulsation on the other gaseous fuel nozzle $10_2$ or $10_1$ is effectively prevented by the partition 24.

Although several embodiments of the present invention are explained in detail above, it is to be understood by one-skilled in the art that the present invention can be modified in a variety of ways without departing from the spirit and scope of the present invention. For example, the number of intake passages of the mixer is not limited to two and is determined according to the number of cylinders of the multicylinder engine.

We claim:

1. A mixer for a multicylinder gas engine comprising:
   a mixer main body;
   a plurality of intake passages provided in the mixer main body that extend to a corresponding plurality of cylinders of the engine and;
   a plurality of gaseous fuel nozzles provided in the mixer main body, each gaseous fuel nozzle having a nozzle orifice opening in a venturi part of a corresponding intake passage, and the plurality of gaseous fuel nozzles being connected to a gaseous fuel supply device;
   a surge tank operatively attached to the mixer main body and housing the plurality of gaseous fuel nozzles; and
   a fuel intake pipe extending to the gaseous fuel supply device and opening in the surge tank,
   wherein intake pressure pulsations that have passed through the gaseous fuel nozzles are attenuated within the surge tank.

2. The mixer according to claim 1, wherein a volume (Vs) of the surge tank is set to be 20% or more of the displacement (Ve) of the engine.

3. The mixer according to claim 1, wherein the nozzle orifice of each gaseous fuel nozzle is positioned at approximately a center of the venturi part of the corresponding intake passage.

4. The mixer according to claim 1, wherein disposed between each of the plurality of gaseous fuel nozzles and the fuel intake pipe is a unidirectional valve that allows fuel to flow in one direction from the fuel intake pipe to the plurality of gaseous fuel nozzles.

5. The mixer according to claim 1, wherein the plurality of intake passages are separate from each other so as to correspond to the plurality of cylinders and not be affected by interference between cylinder intakes, and wherein equalization of intake volumes of the cylinders is achieved.

6. The mixer according to claim 1, wherein the surge tank is disposed between the plurality of gaseous fuel nozzles.

7. The mixer according to claim 1, wherein an end of each gaseous fuel nozzle opposite the nozzle orifice opening in the venturi part projects beneath the mixer main body and into the surge tank.

8. The mixer according to claim 7, wherein a fuel jet that meters an amount of gaseous fuel entering from the surge tank is provided in the end of the gaseous fuel nozzle projecting beneath the mixer main body and into the surge tank.

9. The mixer according to claim 1, wherein each of the intake passages are structurally independent of each other.

10. The mixer according to claim 1, wherein the fuel intake pipe is disposed between the plurality of intake passages.

11. The mixer according to claim 1, wherein the surge tank comprises a main chamber and a plurality of small chambers that are smaller in size relative to the main chamber.

12. The mixer according to claim 11, wherein the plurality of small chambers are disposed such that an end of a corresponding gaseous fuel nozzle opposite the nozzle orifice opens therein.

13. The mixer according to claim 12, wherein the plurality of small chambers are separated from each other and the main chamber by partitions and the fuel intake pipe opens into the main chamber of the surge tank.

14. The mixer according to claim 13, wherein a one-way valve is provided in a corresponding partition of a corresponding small chamber.

15. The mixer according to claim 14, wherein the one-way valve is a reed valve.

16. The mixer according to claim 1, wherein a one-way valve is provided between a surge tank entrance of a corresponding gaseous fuel nozzle.

17. The mixer according to claim 1, wherein a dividing wall is provided between the plurality of gaseous fuel nozzles to partition the surge tank.

18. The mixer according to claim 17, wherein an opening is provided in the dividing wall.

19. The mixer according to claim 18, wherein the opening is disposed at a position furthest from the gaseous fuel nozzles.

20. The mixer according to claim 18, wherein the opening provides communication between the gaseous fuel nozzles and the fuel intake pipe that is disposed to face the opening.

* * * * *